United States Patent [19]

Fitch et al.

[11] Patent Number: 4,942,410

[45] Date of Patent: Jul. 17, 1990

[54] TONER RECEPTIVE COATING

[75] Inventors: John J. Fitch, Natick; Tim Parker, Shrewsbury, both of Mass.

[73] Assignee: Dennison Manufacturing Company, Framingham, Mass.

[21] Appl. No.: 376,888

[22] Filed: Jul. 6, 1989

[51] Int. Cl.[5] .............................................. G01D 15/00

[52] U.S. Cl. ................................ 346/160.1; 346/135.1

[58] Field of Search ..................... 346/160.1, 159, 74.2, 346/105, 135.1; 355/252, 245; 430/101, 102, 107, 108, 109, 110, 111

[56] References Cited

U.S. PATENT DOCUMENTS 4,859,550 8/1989 Gruber et al. ...................... 430/110

*Primary Examiner*—Arthur G. Evans
*Attorney, Agent, or Firm*—Barry D. Josephs

[57] ABSTRACT

The invention comprises a toner receptive coating for substrates, typically paper, for use in conventional printers such as ion deposition printers and photostatic copiers. The coating on paper or polymeric film improves the print density and durability of text or images transferred thereto from printers or copiers, particularly those which employ dry magnetic toner. The coating eliminates the need to use heat fusing to fix the transferred toned image to the substrate. The coating is composed of pressure sensitive polymeric binder material and particulate fillers. The polymeric binder has a glass transition temperature less than 20° C. preferably a glass transition temperature between −10° C. and +10° C. The fillers include a polymeric filler, typically a polyethylene wax or a polyethylene/polytetrafluoroethylene wax mixture and a mineral filler, typically particulate silicon dioxide. The receptive coating also improves the smudge resistance of transferred toned images, particularly when employing dry magnetic toner.

23 Claims, No Drawings

TONER RECEPTIVE COATING

BACKGROUND OF THE INVENTION

1. Field of the Invention

The present invention relates to coating paper for printers. The invention particularly relates to coating paper for ion deposition printers which employ dry magnetic toner.

2. Discussion of the Prior Art

A number of conventional printers and copiers employ dry magnetic toner.

Ion deposition high speed printers, for example; as disclosed in U.S. Pat. No. 4,409,604, are in conventional use as computer mainframe printers or in other service such as the printing of tags and labels.

These printers normally employ dry magnetic toner to form a toned latent image transferrable from the printer's dielectric imaging cylinder to receiving paper. In practice, in order to obtain the best print quality and toned image density, heat fusing equipment is often employed within the printer. The toned latent image on the dielectric imaging cylinder is subjected to heat fusing immediately after transfer whereupon the toned image is heat fused to the receiving paper. While the process of heat fusing improves print quality, it involves expensive heating equipment within the printer and added operational complexity. It has thus been an objective in this art to eliminate the heat fusing equipment without sacrifice in image density and print quality. In addition to eliminating the heat fusing step, it has also been a long standing objective to improve the smudge resistance of the transferred toned image on the receiving paper.

Dry magnetic toners normally require heat and pressure to melt fuse the particles to the substrate being printed. These toners comprise thermoplastic resin binders, colored pigment and magnetic additives or charge control agent. The toner described in U.S. Pat. No. 4,528,257 is representative of this type which employs a crystalline resin with a glass transition temperature ($T_G$) of 45° C. to 90° C. and an immiscible amorphous resin component with a $T_G$ of 10° C. higher than the crystalline resin. U.S. Pat. No. 4,508,257 represents an attempt to improve print quality and to permit faster printing speeds with reduced fusion temperatures. Heretofore, cold pressure fixing of a dry magnetic toner image on plain, coated or impregnated papers does not fully compare in print quality to that offered by heat fusion or alternate printing means such as thermal. Cold pressure fixing systems were developed to eliminate heat fusing and associated fire hazards, to reduce warm up time and lower the system's overall energy requirements. However, cold pressure fixing normally requires high nip pressures (well above 100 pounds/linear inch) which increases paper gloss and results in a glossy black image.

SUMMARY OF THE INVENTION

It is the object of this invention to provide a non-blocking pressure sensitive coating which can be applied economically in wide widths or in line on a flexo press during the printing operation which overcomes the limitations and drawbacks of heat fusion and very high pressure cold fixing. We have discovered that a coating containing amorphous polymer binders with low glass transition temperatures ($T_G$) under 20° C., preferably between −10° C. to +10° C., coupled with particulate mineral fillers above one (1) micron to provide "tooth" to capture and secure dry magnetic toner particles will permit excellent cold pressure fixing at nip roll pressures at about 100 lbs./linear inch as well as at higher pressures. Preferred polymer binders are vinyl acrylic copolymers or ethylene vinyl chloride. The invention is not intended to be limited by these species. The filler particles typically contain a polymeric filler and a mineral dispersant filler. The polymeric filler is preferably a polyethylene and polytetrafluoroethylene wax blend or a polyethylene wax. The mineral dispersant filler is typically silicon dioxide particles. The invention is not intended to be limited to these materials.

It is theorized that the toner receptive coatings of the invention possess a viscoelastic response to point loading of the relatively large toner particles (about 20 microns) during the roll nip process. It is believed that the point loading creates bonding of the toner particles to the coating by the frictional heat generated at the interface which thermally softens the coating creating a surface wetting of the toner by the fluid amorphous polymer. The particulate mineral filler minimizes the contact area to prevent blocking or sticking of the coating to the back of the paper in roll or sheet form.

The preferred coating formulations balance the smudge resistance, toner adhesion and crease resistance properties. The coatings exhibit much improved smudge resistance as measured by print and bar code legibility. Bar code scanners typically require 65% reflection differential (50% minimum) at 640 nanometers wave length between the printed and unprinted areas. Smudges through handling or package abrasion during shipment against printed labels will smear toner particles into unprinted areas causing difficulty or errors in reading visually or with optical devices. The toner receptive coatings of the invention maximize smudge resistance as measured by retention of opacity in the printed areas or by minimizing toner transfer to adjacent areas after rubbing.

The elimination of a heat fusion requirement in an ion deposition printer or any conventional printers or photostatic copiers which employ dry magnetic toner has significant advantages in cost reduction, durability and performance. Heating of rollers or drums for fusion requires higher power consumption which can result in special wall wiring for higher amperage, restricting placement and unit mobility. Heating machines requires larger envelopes to dissapate the heat to minimize fire hazards. Internal heat present in a printer or copier dries up lubrication requiring more frequent servicing and a reduction in component life. The cost savings permitted by the elimination of the heaters themselves and the downsizing of the envelope is additive with the lower nip roll pressure permitted by the toner receptive coating of this invention which allows downsizing of the pressure components providing a unit which is smaller and lower cost to the end user.

The cost of this coating technology is surprisingly affordable, adding less than 3% of the cost of light to medium weight paper for the materials and it can be applied on a single station of a flexographic press in-line with printing of graphics and bar codes. The coating has been applied to bare and precoated papers and paperboard before and after printing. Applied over small print (1/16" characters) at 150 feet/minute, a minimum loss of detail in the print was observed at an application rate of 1.5 lbs./3000 square foot ream (2.4 grams/square meter) while being fully legible due to the contact transparency of the coating. Overprinting at the subsequent flexo station in line with a solvent based flexo ink produced sharp printing with no evidence of solvent attack.

The coating also tends to fill in thinner areas of the paper being printed for improved thickness uniformity resulting in more complete toner transfer. The coating can also be spot applied where high gloss graphics are printed in adjacent areas. The receptive coating of the invention can also be used in a heat fusion system. The coating can also be applied to polymeric films, e.g., polyester, nylon, cellulose, polyolefins, etc.

DETAILED DESCRIPTION

The toner receptive coating of the present invention when applied to conventional plain copier weight paper provides improved smudge resistance for transferred toned images, particularly when employing dry magnetic toner. Dry magnetic toner typically contains magnetic iron oxide particles, a polymeric binders, e.g., ethylene vinyl acetate and polyamides, and a flow agent, e.g., zinc oxide, to keep the particles from clumping. Conventional ion deposition printing employing dry magnetic toner to which application of the toner receptive coating of the present invention is particularly directed is described for example in U.S. Pat. No. 4,365,549, herein incorporated by reference. Such apparatus forms the toner image on a very hard, smooth image cylinder and transfers the toner image to paper fed through a nip under high pressure between the image cylinder and a relatively compliant transfer roller. In an improvement to the apparatus of U.S. Pat. No. 4,365,549, it has been found desirable to provide a nonparallel orientation, or skew, between the image cylinder and transfer roller. The skewing of these rollers, advantageously by an angle of around 0.5°-1.5°, has been observed to improve transfer efficiency and fusing of the toner image. However, in practice it has been found desirable to provide subsequent heat fusing of the toner image transferred to plain paper, to improve print tenacity.

The toner receptive coating herein has the important advantage that it eliminates the need for heat fusing toner particles onto the receiving paper after the toned image has been transferred to the paper. In the art of ion deposition printing, it is possible to utilize post-transfer heat fusing equipment within the ion deposition printer in order to improve print tenacity. In the apparatus of U.S. Pat. No. 4,365,549 (with skewed rollers) the toned image is transferred from the image cylinder to paper by passing the paper between the image cylinder and a nip roller which contacts the paper under applied pressure and at ambient temperatures up to 130° F. There is no heat fusing at such temperature levels and such temperature levels are below the softening temperature of the toner. A heat fusable toner containing substantially magnetic iron oxide particles and heat fusable resin particles is employed. After the toner image transfers to the paper using the nip roller, the applied heat in a subsequent step fuses the magnetic toner onto the receiving paper. Such heat fusion process has been known to improve print durability in ion deposition printing. However, the heat fusing process requires expensive additional heating and auxiliary control equipment within the body of the ion deposition printer.

The toner receptive coating of the present invention when applied to conventional weight plain copier paper eliminates the need for heat fusing, since the transferred print quality is at least equal to that obtained when heat fusing of toner to conventional plain and coated papers is employed.

The toner receptive coating of the invention additionally has very good adhesion to paper and most polymeric film substrates and importantly does not flake, crack or peel when the printed substrate is creased. The present receptive coating formulations are conveniently prepared under ambient conditions by simple blending and mixing of the coating constituents to form a homogeneous dispersion. The solvent employed in the mixture is nontoxic and is not an environ-mental pollutant. The coating mixture is conveniently applied to plain copier paper, typically 50 lb/ream white plain or prefinished paper, using conventional coating techniques such as gravure or flexographic coating methods. The coating is thus easily applied as a smooth continuous film in patterns or full coverage. It is thereafter immediately subjected to convective hot air drying in order to evaporate solvents resulting in a contiguous, dry translucent coating. The receptive coating is typically applied to the paper at a coating weight in a range between about 1.5 to 3.0 lbs. per ream (3000 sq. ft.). If the coating weight is less than about 1.5 lbs./ream, the desirable toner receptive qualities aforementioned are not optimized. For example, if the coating is too thin, then there will not be enough coating for the transferred toner image to adhere. If the receptive coating is excessive, then longer convective drying time is required to evaporate all the vehicle/solvent in the coating. This is undesirable since it increases the material cost and the processing expenses associated with drying. From a commercial standpoint it has been found desirable to dry the coating at processing speeds of about at least 150 ft./min. using conventional hot air drying methods to coincide with flexographic printing speeds.

The receptive coating formulation of the invention preferably has a clear or whitish translucent appearance after it is applied to the substrate and subsequently dried. The receptive coating is also suitable for application to either plain or prefinished paper that has been previously imprinted with text or design. The receptive coating is preferably translucent with contact clarity in this application as well so that the underlying imprinted design and colors are not obscured. The principal substrates for the toner receptive coating herein described is conventional plain copier paper or label stock typically 50 lb./ream paper. The receptive coating of the invention makes unnecessary the use of conventional prefinished or precoated copier paper. Such paper has not been found to noticeably improve transferred toned image quality or smudge resistance when ion deposition printing is applied or to render unnecessary the heat fusing step. However, the receptive coating of the present invention can be used over such prefinished copier paper with improvements in smudge resistance and transferred image quality with or without heat fusing.

A toner receptive coating having all of the properties and advantages aforementioned is composed preferably of a polymeric filler, a mineral filler, a binder, dispersing agents and vehicle/solvent. It has been determined that preferred binders are polymeric resins having a glass transition temperature, $T_g$, less than about 20° C., preferably, in the range between about $-10°$ C. to $+10°$ C. It has been found that if the glass transition temperature, $T_g$, of the binder is too high then the dried receptive coating will tend to be unresponsive to pressure applied thus not accepting the toner. On the other hand if $T_g$ is too low, then the dried receptive coating tends to be too tacky. A condition wherein the coating has excess tack is undesirable because it in turn causes blocking; that is, sticking of the paper coating to the opposite side of the paper. It has been found most desirable to formulate the receptive coating so that the coating is soft and flexible enough that the hard dry magnetic toner particles forming the transferred image can create an impression in the receptive coating. However, the coating as aforementioned, cannot be too soft or too tacky that the problem of blocking, i.e., sticking occurs. The receptive coating must possess sufficient cohesive strength to avoid contamination of the dielectric imaging cylinder or other machine parts as the coated paper passes through the ion deposition printer. This in turn could degrade transfer image quality and increase equipment service frequency.

In addition to promoting adherence of the transferred toner particles to the receptive coating, the binder importantly should exhibit adequate adhesive properties for other solid particles in the coating formulation to maintain this cohesive integrity. The binder also promotes adequate adhesion of the receptive coating to the underlying paper substrate and/or coatings and finishes thereon.

Although a number of different polymeric binders exhibiting the aformentioned properties are believed possible, a preferred polymeric binder is a vinyl acrylic ester copolymer available as a white water based anionic emulsion sold under the trademark HYCAR 26368 from B.F. Goodrich Co., Chemical Group, Cleveland, Ohio. The emulsion has a specific gravity of 1.06. The copolymer has a glass transition temperature of +5° C.

An alternative vinyl acrylic copolymer is available as a water based white liquid emulsion under the tradename 76 RES 6930 from Unocal Chemicals Division. The emulsion has a viscosity of about 1000 centipoise and the copolymer has a glass transition temperature of −8° C.

Another preferred binder is ethylene vinyl chloride available in a water based dispersion under the trademark AIR FLEX 4514 dispersion from Air Products, Inc.

In order to achieve the best characteristics of the receptive coating, it has been found desirable to add filler materials to the formulation. The filler materials are selected which tend to make the coating less tacky and thereby avoid blocking but yet do not inhibit pressure bonding to the toner particles. Two types of filler are preferentially added to the formulation. The first is a polymeric filler and the second a mineral dispersant filler. The polymeric filler imparts lubricity and a sealing quality to the toned image transferred on the receptive coating. The polymeric filler preferentially should have wax-like properties. A preferred polymer filler has been determined to be a polyethylene and polytetrafluoroethylene wax blend. This blend is available under the tradename POLYBLEND 100 white powder from Micro Powders, Inc. of Scarsdale, N.Y. The Polyblend white powder has an average particle size of about 2 microns, a melting point of about 230° F. (110° C.) and a specific gravity of 1.02. Another suitable polymer filler is a polyethylene wax powder available under the trade designation S394N5 polyethylene wax powder from Shamrock Chemical Corp., Newark, N.J. The S394N5 polyethylene wax powder is a medium density microcrystalline polyethylene wax. It has an average particle size of about 12.5 microns and a melting point of about 235° F. (113° C.). The polymeric fillers aforementioned have been found to impart a smudge resistant characteristic to the transferred toned image on the receptive coating. All the phenomena involved in attainment of the smudge resistant characteristic by employing the aforementioned polymer binder filler is not fully understood. However, it has been found that the aforementioned polyethylene/polytetrafluoroethylene wax blend or polyethylene microcrystalline wax filler provides improved surface slippage when the transferred toned image is rubbed manually or when it is rubbed with another material. It is hypothesized that the rubbing smears a very thin layer of the waxlike polymeric filler over the transferred image and the coating. This imparts a greater degree of overall lubricity to the surface and seals the surface of the printed and unprinted areas thereby inhibiting toner particle movement and transfer to unprinted areas. Surprisingly, the polymeric fillers do not inhibit anchorage of over printing with standard flexographic images. The physical result gives the coated paper a cleaner appearance after rubbing the exposed transferred image than would be the case if the toner receptive coating of the invention were not employed.

The mineral dispersant filler which applicant has found advantageous to include is preferably silicon dioxide particles, such as amorphous silicon dioxide white powder available under the trade mark SYLOID 244 from W. R. Grace Co. The SYLOID 244 silicon dioxide powder has an average particle size of about 3 microns and a surface area of about 310 sq. meters per gram. The silicon dioxide filler appears to serve three important functions in the preferred formulations. Firstly, it increases the surface area providing a rougher topography to capture and secure particles and restrain toner particle mobility. Secondly, it functions as a dispersant to help keep all solid particles in the formulation dispersed. Thirdly, it functions as an antiblocking agent that is, it appears to make the receptive coating less tacky.

It has been found desirable to add a small amount of dispersing agent to the preferred formulation. Dispersing agents are well known in the art and are often used to attain high degree of dispersion of fine solid particles in liquid mixture. A suitable dispersing agent for the present formulation may typically be SOLSPERSE ® 2000 liquid hyperdispersant from Imperial Chemical Industries, PLC. SOLSPERSE ® 2000 liquid hyperdispersant has a specific gravity of about 0.90, a viscosity of about 200 to 300 centipoise at 25° C. and is solvent free. Only a small amount, typically less than 1 percent by weight of the liquid SOLSPERSE need be added to the preferred coating formulation. An alternative suitable dispersing agent may be a mineral spirit/propylene glycol based dispersant such as NUOSPERSE ® 700 liquid dispersant from Nuodex, Inc.

An advantage of the preferred receptive coating formulations is that suitable modifying solvents may be selected from a group of safe nontoxic solvents that are nonenvironmental pollutants. A solvent which has these attributes for use in the preferred coating formulation is simply isopropanol which is premixed with water. Other solvents, for example other lower alcohols and glycols, could also be employed to adjust the drying and coalescing rates.

Specific preferred coating formulations having the aforementioned component types are illustrated by Formulations A, B and C in respective Tables 1, 2 and 3. These formulations for the receptive coating exhibit all of the aforementioned advantageous properties. In particular, when these formulations are employed as the toner receptive coating on plain 50 lb. (81 grams/square meter) copier paper, they give the transferred dry magnetic toned image on the coating, improved image density and quality, improved smudge resistance and inhibit the transferred toned image from flaking or peeling when the coated substrate is creased.

The percent by weight of each component employed in formulations A to C is shown in the respective Tables 1-3:

TABLE 1

Toner Receptive Coating Formulation A (White Translucent)

| | % by Weight |
|---|---|
| Polymeric Filler | |
| Polyethylene/ Polytetrafluoroethylene Wax Blend (e.g., Polyblend 100 White Powder from Micro Powders, Inc.) | 5. |
| Mineral Dispersant Filler | |
| Silicon dioxide (e.g., amorphous Syloid 244 White Powder from W.R. Grace Co.) | 5. |
| Binder | |
| Vinyl acrylic copolymer emulsion (e.g., liquid Hycar 26368 White resin from B. F. Goodrich Co.) | 25. |
| Dispersing Agent | |
| (e.g., viscous clear liquid Solsperse 2000 from Imperial Chemical Industries, PLC.) | 1. |
| Solvents | |
| Isopropyl alcohol | 32. |
| Water | 32. |
| | 100. |

TABLE 2

Toner Receptive Coating Formulation B (White Translucent)

| | % By Weight |
|---|---|
| Polymeric Filler | |
| Polyethylene White Powder - microcrystalline wax (e.g., S394N5 polyethylene powder from Shamrock Co.) | 5. |
| Mineral Dispersant Filler | |
| Silicon Dioxide (e.g., amorphous Syloid 244 white powder from W. R. Grace Co.) | 5. |
| Binder | |
| Vinyl acrylic copolymer emulsion e.g., liquid Hycar 26368 white resin from B. F. Goodrich Co.) | 25. |
| Dispersing Agent | |
| (e.g., viscous clear liquid Solsperse 2000 from Imperial Chemical Industries, PLC.) | 1. |
| Solvents | |
| Isopropyl alcohol | 32. |
| Water | 32. |
| | 100. |

TABLE 3

Toner Receptive Coating Formulation C

| | % By Weight |
|---|---|
| Polymer Filler | |
| Polyethylene/Polytetrafluoroethylene wax blend. (e.g., Polyblend 100 white powder from Micro Powders, Inc.) | 5. |
| Mineral Dispersant Filler | |
| Silicon dioxide (e.g., amorphous Syloid 244 white powder from W. R. Grace Co.) | 5. |
| Binder | |
| Ethylene Vinyl Chloride water based dispersion (e.g., Air Flex 4514 dispersion from Air Products, Inc.) | 25. |
| Dispersing Agent | |
| Mineral Spirit/Propylene Glycol based dispersant (e.g., Nuosperse 700 liquid from Nuodex, Inc.) | 1. |
| Solvents | |
| Water | 32. |
| Isopropyl alcohol | 32. |
| | 100. |

TABLE 4

Toner Receptive Coating Formulation D (white opaque)

| | % By Weight |
|---|---|
| Mineral Fillers | |
| (e.g., Ansilex clay from Englehard, Inc. | 8. |
| Mineral Dispersant Filler | |
| Silicon Dioxide (e.g., amorphous Syloid 244 white powder from W. R. Grace Co.) | 10. |
| Binder | |
| Vinyl acrylic copolymer emulsion (e.g., 76 RES 6930 liquid water based emulsion from Unocal Chemicals Division) | 40. |
| Defoaming Agent | |
| (Silicone based liquid defoaming agent Colloid 999 from Colloids, Inc.) | 0.5 |
| Pigment | |
| (Titanium dioxide-white) e.g., Hiltasperse white from Hilton-Davis Co. | 1.5 |
| Diluent | |
| 10% ammonia Solution in water | 40. |
| | 100. |

The formulations A to C are similar except that a polymeric filler of polyethylene microcrystalline wax is employed in Formulation B whereas the polymeric filler in Formulation A and C is a polyethylene/polytetrafluoroethylene wax blend. The preferred polymer binder in Formulation A and B is the vinyl acrylic copolymer emulsion, e.g., liquid HYCAR 26368 whereas the polymer binder employed in Formulation C is the ethylene vinyl water based dispersion, e.g., AIR FLEX 4514 dispersion from Air Products, Inc. In each formulation A to C silicon dioxide particles, e.g., SYLOID 244 white powder was employed. The dispersing agent and modifying solvents for Formulations A to C. are shown in the respective tables. These formulations (A to C) appeared as a whitish translucent coat after they were applied to plain paper substrate and subsequently dried, but have contact transparency.

Another formulation for the receptive coating is illustrated in Table 4. This formulation differs somewhat from formulation A to C, particularly in that a clay filler instead of a polymeric filler was employed. The other components were substantially the same as those shown in Table I except that white pigment was added and the diluent system employed was a 10% ammonia solution to adjust the viscosity and stabilize the pH of the dispersion.

The formulation D when coated on plain paper substrate left a smooth whitish opaque coating on drying. The formulation D upon drying exhibited all of the aforementioned improved properties that formulations A to C showed except it did not notably improve the smudge resistant characteristic of the transferred toned image. Importantly, however, it improved the transferred image density and inhibit the toned image from peeling or flaking after the substrate was creased. This formulation, however, tended to foam somewhat during the coating step at higher coating speeds and therefore from an application standpoint is not as desirable as formulation A to C for high speed flexographic printing. Also since the formulation D coating is opaque it is not intended for use over substrates that have been previously preprinted with design or text. Other pigments could be incorporated in like manner.

The coating formulations A to D as presented in Tables 1 to 4 respectively, were all prepared under ambient conditions by simply blending the formulation components by use of conventional stirring mixer. It was found preferable to mix the components of formulation A to D by first adding all of the filler components to a mixing container and then adding solvents and dispersing or defoaming agents. The mix was then stirred for a few minutes under ambient conditions until a homogeneous mixture was obtained. At this point, the binder was added and the mix was continually stirred a few minutes longer to obtain a homogeneous mixture. The constituents were added for each Formulation A to D in the amounts indicated in the respective Tables 1 to 4.

Each of the respective coating mixtures was then applied to plain 50 lbs./ream (81 gpsm=grams/square meter) paper at a coat weight of between about 1.5 to 3.0 lbs. per ream (2.4 to 4.9 gpsm) using conventional gravure or flexographic coating methods. Each coating was dried by passing the coated substrate through conventional hot air convective driers. Each one of the preferred coating formulations A to D upon drying produced a smooth, flexible toner receptive coating on the paper substrate.

Qualitative tests were made in the laboratory to compare the properties of the various receptive coated paper substrates coated with Formulations A to D and bare or other coated paper substrates after dry magnetic toned image had been transferred onto these substrates using unheated pressure nip rollers at pressures of about 100 pli. Thus, five sample substrates, four coated and one uncoated, all with transferred image thereon were tested. In each sample, a plain 50 lbs./ream (81 gpsm) paper substrate was employed. Four basic tests were performed. The first test measured the resistance to flaking of the transferred toned image after the substrate with transferred toned image thereon was creased one time. It was then observed whether any of the toned image flaked along the crease line.

A second test was made to determine the smudging characteristic of the transferred toned image on the various sample substrates. This test was performed by using a standard Sutherland rub tester apparatus. Each of the sample substrates containing transferred toned image was rubbed the same number of cycles and the sample was then tested for smudge on areas adjacent to the images.

A third test was performed on each of the sample substrates containing transferred toned image to measure the degree to which the transferred toned image adhered to the substrate.

A fourth test on the samples was made to evaluate the tendency , if any, of the substrate to block, that is to stick together after the substrate had been rolled up and subsequently unwound or stacked in sheet form.

When the crease test was performed, it was found that discernible flaking of the transferred toned image on plain paper or papers with harder coatings occurred along the crease line. By contrast, no discernible flaking of the transferred toned image occurred on the crease line when any of the receptive coating Formulations A to D were employed on the bare or precoated papers, or film substrates.

Smudging of the toned image on uncoated paper samples as clearly visible after the sample was subjected to 50 rubbing strokes on the Sutherland rub tester. In comparison, the samples employing the toner receptive coating Formulations A to C of the present invention showed resistance to smudging when the toned image thereon was rubbed the same number of cycles, i.e., 50 strokes, using the same equipment. Although there were some smudge marks discernible when the coated Formulations A to C were employed, such smudges were much reduced than when the uncoated reference sample was employed. There was only slight improvements in smudge resistance when formulation D was employed when compared with the uncoated sample.

The degree of adhesion of the toned image to the paper substrate for each sample including the uncoated sample was determined qualitatively. The test was accomplished by applying a strip of conventional 3M Brand Scotch Tape to the exposed toned image on each sample. The tape was then peeled back and the amount of toned image which adhered to the tape was determined by making surface densitometer measurements of the toned image on the paper substrate before and after stripping the tape from the substrate. The results of these tests clearly indicated that much more toned image, e.g., about 20% more toned image was stripped away from the uncoated reference substrate than from the coated substrates in which coating Formulations A to D were employed.

A final qualitative test was performed to determine if any of the five above-mentioned samples showed any tendency to "block", i.e., stick together when the respective substrate samples containing toned image thereon were unwound from a roll. There was no blocking evident when the toner receptive coating Formulations (A to D) were employed. There was also no blocking indicated when the uncoated sample was used. These tests were performed at elevated temperatures of 120° F. to 140° F. under humid conditions to assure that the receptive coating formulation of the invention would not cause blocking even if the substrate roll were stored at such extreme conditions.

Although preferred formulations for the toner receptive coating of the invention have been described, it should be appreciated that alternative formulations are possible without departing from the scope and concept of the present invention. For example, the various important properties of each component in the preferred formulation has been described along with the properties of the coating as a whole. Accordingly, it should be appreciated that those skilled in the art could find alternatives to the preferred components without departing from the scope and concept of the present invention. Accordingly, the invention is not intended to be limited by the specific embodiments described herein but rather is defined by the claims and equivalents thereof.

What is claimed is:

1. A toner receptive coating for paper substrates and polymeric film substrates for use in receiving pressure transferred toned images from printers and electrostatic copiers employing dry magnetic toners, said toner receptive coating comprising:

a blend of particulate fillers comprising particulate mineral filler and a particulate polymeric wax filler, and a polymeric binder for the blend of particulate fillers, said particulate mineral filler having the property of securing said dry toner particles and restraining their mobility, and said mineral filler reducing coating tack to prevent the coating from sticking to the underside of the substrate if the substrate is unwound from a roll, and said particulate polymer wax filler having the property of imparting lubricity to the coating so that the dry magnetic toned images transferred to the coating will not substantially rub off onto adjacent portions of the coating on the substrate if the transferred toned image is rubbed or abraded.

2. A toner receptive coating as in claim 1 wherein the polymeric binder has a glass transition temperature below about 20° C., said polymeric binder promoting adherence of the transferred toner particles to the receptive coating and said binder promoting adhesion of the particulate fillers to said binder.

3. A toner receptive coating as in claim 2 wherein the polymeric binder has a glass transition temperature between about −10° C. to 10° C.

4. A toner receptive coating as in claim 2 wherein said coating avoids the need for heat fusing the toned transferred image to the substrate.

5. A toner receptive coating as in claim 2 wherein the coating is formed by applying it to the substrate in the form of a dispersion of said particulate fillers and polymeric binder in a liquid medium and hence subsequently evaporating the liquid medium by convective heat.

6. A toner receptive coating as in claim 4 wherein the coating has the property that it permits transfer of toned images from a dielectric imaging cylinder to the substrate coated with said receptive coating wherein said coated substrate is exposed to ambient temperatures during said transfer.

7. A toner receptive coating as in claim 1 wherein the coating is translucent with sufficient contact clarity so that printed matter on the substrate will still be legible if the coating is applied over said printed matter.

8. A toner receptive coating as in claim 1 wherein the particulate mineral filler comprises silicon dioxide.

9. A toner receptive coating as in claim 1 wherein the polymeric filler comprises polyethylene wax.

10. A toner receptive coating as in claim 1 wherein the polymeric filler comprises a blend of polyethylene wax and polytetrafluoroethylene.

11. A toner receptive coating as in claim 2 wherein the polymeric binder comprises vinyl acrylic copolymer.

12. A toner receptive coating as in claim 2 wherein the polymeric binder comprises ethylene vinyl chloride.

13. A toner receptive coating as in claim 1 for paper substrates for use in receiving pressure transferred toned images from ion deposition printers employing dry magnetic toner.

14. A method of transferring a toned image from a dielectric imaging cylinder of an ion deposition printer to a paper substrate wherein dry magnetic toner is employed as the toning medium, comprising the steps of:

(a) applying a toner receptive coating to the paper substrate to form a coated paper substrate, (b) passing the coated paper between a pressure nip roller and a dielectric imaging cylinder having a toned image thereon, the pressure nip roller operating at a temperature below the softening temperature of the toner whereupon the toned image is transferred to the coated paper substrate, (c) not exposing the transferred toned image on the paper substrate to a step of heat fusing, said receptive coating comprising a blend of particulate mineral filler and particulate polymeric wax filler, said receptive coating having the property of causing sufficient adherence of the transferred toned image thereto and sufficient smudge resistance, thus obviating the need to subject the transferred toned image to a step of heat fusing.

15. A method as in claim 14 wherein the receptive coating further comprises a polymeric binder having a glass transition temperature below about 20° C., said polymeric binder promoting adherence of the transferred toner particles to the receptive coating and said binder further promoting adhesion of the particulate fillers to the binder.

16. A method as in claim 15 wherein the polymeric binder has a glass transition temperature between about −10° C. and 10° C.

17. A method as in claim 15 wherein the coating is translucent with sufficient contact clarity so that printed matter on the substrate will still be legible if the coating is applied over said printed matter.

18. A method as in claim 15 wherein the particulate mineral filler comprises silicon dioxide.

19. A method as in claim 15 wherein the polymeric filler comprises polyethylene wax.

20. A method as in claim 15 wherein the polymeric binder comprises vinyl acrylic copolymer.

21. A method as in claim 15 wherein the polymeric filler comprises a blend of polyethylene wax and polytetrafluoroethylene.

22. A method as in claim 15 wherein the polymeric binder comprises ethylene vinyl chloride.

23. A toner receptive coating for paper substrates and polymeric film substrates for use in receiving transferred toned images from printers and electrostatic copiers employing dry magnetic toners, said toner receptive coating comprising:

a polymeric binder matrix;

particulate material therein for securing said dry toner particles and restraining their mobility; and particulate polymer wax filler within said binder matrix; said polymer filler having the property of imparting lubricity to the coating so that the dry magnetic toned images transferred to the coating will not substantially rub off onto adjacent portions of the coating on the substrate if the transferred toned image is rubbed or abraded.

* * * * *